UNITED STATES PATENT OFFICE.

WILLIAM A. G. BIRKIN, OF NOTTINGHAM, ENGLAND.

PROCESS OF AND SOLVENT FOR SEPARATING PRECIOUS METALS FROM THEIR ORES.

SPECIFICATION forming part of Letters Patent No. 494,054, dated March 21, 1893.

Application filed January 21, 1893. Serial No. 459,273. (No specimens.)

*To all whom it may concern:*

Be it known that I, WILLIAM A'COURT GRANVILLE BIRKIN, a subject of the Queen of Great Britian, residing at Nottingham, England, have invented new and useful Improvements in Processes of and Solvents for Separating Precious Metals from their Ores, of which the following is a specification.

My invention relates to the extraction of metals, and particularly the precious metals, from their ores.

It is the purpose of my invention to provide a novel and simple process for the purpose named, whereby the pulverized ores are subjected to the action of a solvent compound, to dissolve the metals, which are afterward separated from the solution in any suitable manner.

My invention also has for its purpose the provision of a novel fluid-compound especially adapted for the decomposition of the precious metals from the ores in which such metals are contained.

The invention consists, to these ends, in the process of treatment and in the novel fluid-compound hereinafter fully described and then more particularly pointed out and defined in the claims annexed to this specification.

To enable others skilled in the art to which my said invention pertains to fully understand and practice the same, I will proceed to describe said invention fully and in detail, and will then indicate briefly the novel parts, or features thereof.

In the practical use of my said invention I follow, in substantial respects, a mode of procedure consisting of the following steps: The ore is first pulverized to a suitable fineness, which will be controlled, usually, by the refractory character of the ore, the more unyielding being preferably reduced to a finely pulveri.ed condition. The pulverized or finely divided ore is then placed in a menstruum consisting of potassium cyanide, and ferri-cyanide, in water, to which a suitable quantity of peroxide of hydrogen is added to intensify the acid reaction. The ore is subjected to agitation, while attacked by this solution, by any convenient means. When the process is completed, the fluid, which then contains the metals in solution, or suspension, is drawn off, or decanted, or otherwise separated from the mineral constituents of the ore, and the values are eliminated either by precipitation, deposition, electrolysis, or by any method preferred for this purpose.

I may, and in some cases shall, employ heat to aid and expedite the action of the fluid-compound described in attacking the metals of the ores, but I do not limit my invention either to the use, or to the absence, of this step.

I prefer to employ the ingredients mentioned in about the proportions following, viz: to one gallon of water I use about three ounces of potassium cyanide, and with an equal quantity of water I mingle about one ounce of potassium ferri-cyanide. To the mixture of the two solutions named I add about five per cent. of peroxide of hydrogen, these proportions being regarded as preferable. This matter is subject to considerable variation, however, and I do not limit myself to any particular, or special proportion.

What I claim is—

1. In the art of separating metals from their ores, the process set forth which consists in subjecting an ore, suitably comminuted to the action of a menstruum composed of potassium cyanide, potassium ferri-cyanide, and peroxide of hydrogen, in water, agitating the said ore, and finally separating the values out of solution, substantially as described.

2. The fluid solvent for removing precious metals from their ores, the same consisting of potassium cyanide, potassium ferri-cyanide, and peroxide of hydrogen in water, in the proportions specified, or thereabout, substantially as described.

In testimony whereof I have hereunto set my hand in presence of two subscribing witnesses.

WILLIAM A. G. BIRKIN.

Witnesses:
ALBERT H. NORRIS,
T. A. GREEN.